(12) United States Patent
Shishido

(10) Patent No.: US 9,739,942 B2
(45) Date of Patent: Aug. 22, 2017

(54) METHOD FOR MANUFACTURING OPTICAL CIRCUIT BOARD

(71) Applicant: KYOCERA Corporation, Kyoto-shi, Kyoto (JP)

(72) Inventor: Itsuroh Shishido, Otsu (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/332,256

(22) Filed: Oct. 24, 2016

(65) Prior Publication Data

US 2017/0115453 A1   Apr. 27, 2017

(30) Foreign Application Priority Data

Oct. 26, 2015 (JP) .................................. 2015-209522
Dec. 22, 2015 (JP) .................................. 2015-249208

(51) Int. Cl.
*G02B 6/13* (2006.01)
*G02B 6/12* (2006.01)
*G02B 6/42* (2006.01)

(52) U.S. Cl.
CPC ........... *G02B 6/13* (2013.01); *G02B 6/12004* (2013.01); *G02B 6/428* (2013.01); *G02B 6/4224* (2013.01); *G02B 2006/12104* (2013.01)

(58) Field of Classification Search
CPC ...... G02B 6/13; G02B 6/12004; G02B 6/428; G02B 6/4224; G02B 2006/12104
See application file for complete search history.

(56) References Cited

U.S. PATENT DOCUMENTS

| | | | | |
|---|---|---|---|---|
| 8,116,633 B2* | 2/2012 | Yasuda | ................ | G02B 6/4201 385/14 |
| 8,142,672 B2* | 3/2012 | Hodono | ................... | G02B 6/13 216/2 |
| 2008/0252401 A1* | 10/2008 | Margomenos | .......... | H01P 1/219 333/210 |

FOREIGN PATENT DOCUMENTS

JP     2005-099514     4/2005

* cited by examiner

*Primary Examiner* — Ryan Lepisto
(74) *Attorney, Agent, or Firm* — Volpe and Koenig, P.C.

(57) ABSTRACT

A method for manufacturing an optical circuit board includes: forming an optical waveguide having a structure that a core is sandwiched between a lower clad layer and an upper clad layer so as to extend along an upper surface of a glass plate; forming a glass plate-side positioning mark composed of the same material as the core, between the lower clad layer and the upper clad layer in a region other than the core; forming a reflection surface at a part of the core; preparing a wiring board having a board-side positioning mark; and mounting the glass plate having the optical waveguide formed thereon so that the glass plate-side positioning marks and the board-side positioning mark are superimposed on each other.

6 Claims, 5 Drawing Sheets

Region for mounting electronic component

METHOD FOR MANUFACTURING OPTICAL CIRCUIT BOARD

BACKGROUND OF THE INVENTION

Field of the Invention

The present disclosure relates to a method for manufacturing an optical circuit board having a reflection surface configured to redirect optical signals.

Description of the Related Art

FIG. 5 shows a conventional optical circuit board B configured to mount an electronic component D thereon. The conventional optical circuit board B includes a wiring board 20 and an optical waveguide 21. This type of conventional optical circuit board B is disclosed in, for example, Japanese Unexamined Patent Publication No. 2005-99514.

The wiring board 20 includes an insulating layer 22 and a wiring conductor 23. The insulating layer 22 is provided with through holes 24. The wiring conductor 23 is formed on upper and lower surfaces of the insulating layer 22 and inside the through holes 24. An electronic component connection pad 25 composed of a part of the wiring conductor 23 is formed on the upper surface of the insulating layer 22. An electronic component connection pad 25 is configured to mount the electronic component D thereon. An external connection pad 26 composed of a part of the wiring conductor 23 is formed on the lower surface of the insulating layer 22. The external connection pad 26 is configured to have a wiring conductor of an external circuit board connected thereto.

The optical waveguide 21 is disposed on the wiring board 20. The optical waveguide 21 is formed of a lower clad layer 21a, a core 21b, and an upper clad layer 21c. The optical waveguide 21 is configured to receive optical signals transmitted thereto. The lower clad layer 21a and the upper clad layer 21c that constitute the optical waveguide 21 are composed of a planar insulating layer. The core 21b has a slender band shape and a rectangular cross section. The lower clad layer 21a and the upper clad layer 21c surround the core 21b while being in close contact with surfaces of the core 21b. The core 21b further has a reflection surface M on one end thereof. The reflection surface M is constituted by a cut surface that is perpendicular to an extension direction of the core 21b and has a predetermined angle with respect to the upper surface of the wiring board 20. Transmission and receiving of optical signals between the optical waveguide 21 and the electronic component D are performed through the reflection surface M.

A conventional method for manufacturing an optical circuit board is described below with reference to FIGS. 6 and 7. The same parts as those in FIG. 5 are labeled with the same reference numerals.

As shown in FIG. 6A, the insulating layer 22 provided with a plurality of the through holes 24 is prepared. The insulating layer 22 is formed by impregnating, for example, an epoxy resin and a bismaleimide triazine resin into a glass cloth, followed by thermal curing. Subsequently, as shown in FIG. 6B, the wiring board 20 is formed by depositing the wiring conductor 23 onto the upper and lower surfaces of the insulating layer 22 and onto the inside of the through holes 24.

As shown in FIG. 6C, the lower clad layer 21a is subsequently formed on the upper surface of the wiring board 20. As shown in FIG. 6D, the core 21b is subsequently formed on the upper surface of the lower clad layer 21a. As shown in FIG. 7E, the upper clad layer 21c is subsequently formed on the upper surface of the core 21b. The optical waveguide 21 is thus formed.

Finally, as shown in FIG. 7F, the core 21b is cut by causing a blade to cut into the core 21b from immediately above the optical waveguide 21. Thus, the conventional optical circuit board B as shown in FIG. 5 is formed by forming the reflection surface M constituted by the cut surface that is perpendicular to the extension direction of the core 21b and has the predetermined angle with respect to the upper surface of the wiring board 20. When forming the reflection surface M, alignment between a central axis in the extension direction of the core 21b and a central position of the reaction surface B is achieved in advance. This makes it possible to accurately perform the transmission and receiving of optical signals between the optical waveguide 21 and the electronic component D. As used herein, the term "central position of the reflection surface M" denotes a position at which a pair of diagonals of the rectangular reflection surface M intersect.

When the optical circuit board B is formed by the conventional manufacturing method, the optical waveguide 21 configured to have the reflection surface M formed thereon is formed on the upper side of the wiring board 20. In some cases, the wiring board 20 may already be subjected to warping due to a thermal history during the manufacturing. The occurrence of warping makes it difficult to accurately cause the blade to cut into a predetermined position of the core 21b when cutting the core 21b with the blade in order to form the reflection surface M. It is therefore difficult to achieve alignment between the central axis in the extension direction of the core 21b and the central position of the reflection surface M. It is consequently difficult to accurately perform the transmission and receiving of optical signals between the optical waveguide 21 and the electronic component D.

SUMMARY OF THE INVENTION

A method for manufacturing an optical circuit board according to the present disclosure includes: forming an optical waveguide having a structure that a core is sandwiched between a lower clad layer and an upper clad layer so as to extend along an upper surface of a glass plate, and forming a glass plate-side positioning mark composed of the same material as the core, between the lower clad layer and the upper clad layer in a region other than the core; forming a reflection surface at a part of the core by cutting the core, the reflection surface being constituted by a cut surface that is perpendicular to an extension direction of the optical waveguide, has a predetermined angle with respect to the upper surface of the glass plate, and extends from the upper surface of the core to the lower surface of the core; preparing a wiring board having, on an upper surface thereof, a board-side positioning mark corresponding to the glass plate-side positioning mark; and mounting the glass plate having the optical waveguide formed thereon on the upper surface of the wiring board so that the glass plate-side positioning mark and the board-side positioning mark are superimposed on each other.

An optical circuit board according to the present disclosure include: a wiring board including an insulating layer, a wiring conductor, and a board-side positioning mark; and an optical waveguide forming part including an optical waveguide. The optical waveguide forming part includes a glass plate and the optical waveguide extending along an upper surface of the glass plate. The optical waveguide has a structure that a core provided with a glass plate-side positioning mark composed of the same material as the core is sandwiched between a lower clad layer and an upper clad layer. The core includes a reflection surface constituted by a cut surface extending from an upper surface of the core to a lower surface of the core so as to be perpendicular to an extension direction of the optical waveguide and have a certain angle with respect to the upper surface of the glass plate. The optical waveguide forming part is mounted on an upper surface of the wiring board so that the board-side positioning mark and the glass plate-side positioning mark are superimposed on each other.

DESCRIPTION OF THE EMBODIMENTS

Figure 1:
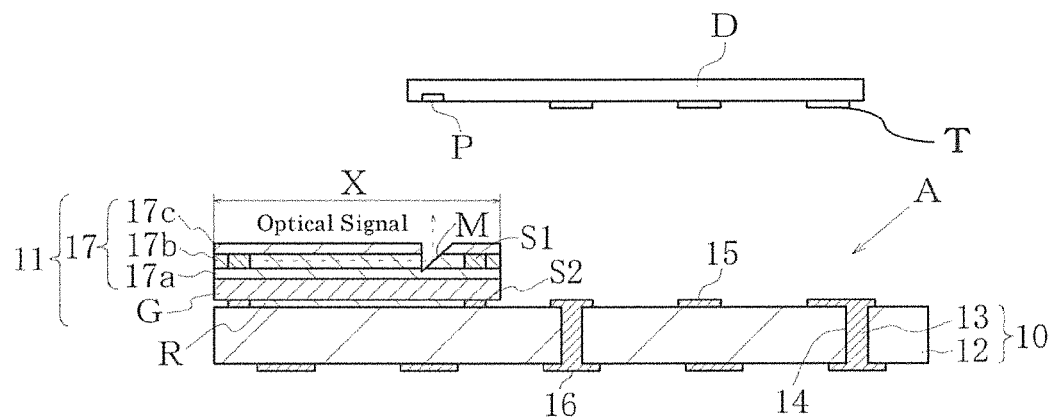
FIG. 1 is a schematic sectional view that shows an optical circuit board to be formed by an embodiment of a method for manufacturing an optical circuit board according to the present disclosure.

With a method for manufacturing an optical circuit board according to the present disclosure, an optical waveguide having a structure that a core is sandwiched between a lower clad layer and an upper clad layer is formed so as to extend along an upper surface of a glass plate, and a glass plate-side positioning mark composed of the same material as the core is formed between the lower clad layer and the upper clad layer in a region other than the core. A reflection surface is subsequently formed at a part of the core by cutting the core. The reflection surface is constituted by a cut surface that is perpendicular to an extension direction of the optical waveguide, has a predetermined angle with respect to the upper surface of the glass plate, and extends from an upper surface of the core to a lower surface of the core. A wiring board having, on an upper surface thereof, a board-side positioning mark corresponding to the glass plate-side positioning mark is subsequently prepared. The glass plate having the optical waveguide formed thereon is subsequently mounted on the upper surface of the wiring board so that the glass plate-side positioning mark and the board-side positioning mark are superimposed on each other. Consequently, the reflection surface can be formed at an accurate position by cutting the core. It is therefore possible to provide the optical circuit board capable of accurately performing transmission and receiving of optical signals between the optical waveguide and an electronic component by achieving alignment between a central axis in the extension direction of the core and a central position of the reflection surface.

The optical circuit board manufactured by an embodiment of the method for manufacturing the optical circuit board according to the present disclosure is described in detail below. The optical circuit board A shown in FIG. 1 includes a wiring board 10 and an optical waveguide forming part 11.

The wiring board 10 includes an insulating layer 12 and a wiring conductor 13. The insulating layer 12 has a plurality of through holes 14. The wiring conductor 13 is formed on upper and lower surfaces of the insulating layer 12 and inside the through holes 14. The insulating layer 12 has, on the upper surface thereof, a mounting part X configured to mount the optical waveguide forming part 11 thereon. The mounting part X is provided with a plurality of board-side positioning marks S2 formed at positions respectively corresponding to a plurality of glass plate-side positioning marks S1. A plurality of electronic component connection pads 15 are formed on the upper surface of the insulating layer 12. The electronic component connection pads 15 are configured to have an electronic component D mounted thereon. A plurality of external connection pads 16 are formed on the lower surface of the insulating layer 12. The electronic component connection pads 15 and the external connection pads 16 are composed of a part of the wiring conductor 13.

The optical waveguide forming part 11 is mounted on the mounting part X of the wiring board 10 via an adhesive R. The optical waveguide forming part 11 includes a glass plate G and an optical waveguide 17. The optical waveguide 17 includes a lower clad layer 17a, a core 17b, and an upper clad layer 17c. The optical waveguide 17 is formed so as to extend along an upper surface of the planar glass plate G. The optical waveguide 17 is configured to receive optical signals transmitted thereto. The lower clad layer 17a and the upper clad layer 17c, each constituting the optical waveguide 17, are composed of a planar insulating layer. The core 17b has a slender band shape and a rectangular cross section. The lower clad layer 17a and the upper clad layer 17c surround the core 17b while being in close contact with surfaces of the core 17b.

The core 17b further has a reflection surface M on one end thereof. The reflection surface M is constituted by a cut surface that is perpendicular to an extension direction of the core 17b, has a predetermined angle with respect to the upper surface of the glass plate G, and extends from an upper surface of the core 17b to a lower surface of the core 17b. The angle is set to a desired angle depending on the use and size of the optical circuit board A, and on the kind of an electronic component to be mounted thereon. The angle is usually set to approximately 30 to 60 degrees. The alignment between the central axis in the extension direction of the core 17b and the central position of the reflection surface M is achieved, and therefore, transmission and receiving of optical signals between the optical waveguide 17 and the electronic component D are performed accurately through the reflection surface M.

An embodiment of the method for manufacturing the optical circuit board according to the present disclosure is described in detail below with reference to FIGS. 2 and 3. The same parts as those in FIG. 1 are labeled with the same reference characters, and their detailed descriptions are omitted.

Figure 2A:
FIGS. 2A to 2D are schematic sectional views that respectively show the steps in the embodiment of the method for manufacturing the optical circuit board according to the present disclosure.

As shown in FIG. 2A, the lower clad layer 17a is formed on the upper surface of the glass plate G. The glass plate G is formed of an inorganic insulating material, such as alkali glass, alkali-free glass, and crystallized glass. The lower clad layer 17a is formed by thermal curing of a photosensitive sheet or photosensitive paste containing, for example, an epoxy resin or polyimide resin. Specifically, the lower clad layer 17a is formed by depositing or applying the photosensitive sheet or photosensitive paste containing the resin onto the glass plate G, and then causing the sheet or paste to cover the entire upper surface of the glass plate G by exposure and development, followed by thermal curing. The lower clad layer 17a has a thickness of approximately 10-20 µm.

Figure 2B:
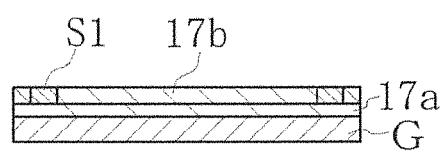

Subsequently, as shown in FIG. 2B, the core 17b and the glass plate-side positioning mark S1 are formed on the upper surface of the lower clad layer 17a. The core 17b is formed by thermal curing of a photosensitive sheet containing, for example, an epoxy resin or polyimide resin. Specifically, the core 17b is formed by depositing the photosensitive sheet containing the resin onto the lower clad layer 17a in a vacuum state, and then forming this into a band shape by exposure and development, followed by thermal curing. A refractive index of the resin constituting the core 17b may be larger than a refractive index of the resin constituting the lower clad layer 17a and the upper clad layer 17c. The core 17b has a thickness of approximately 30-40 µm. A plurality of the glass plate-side positioning marks 51 are formed from the same material and by the same method, at the same as the core 17b on the lower clad layer 17a in a region other than the core 17b.

Figure 2C:
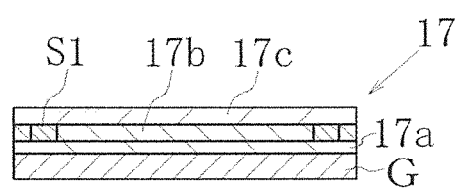

Subsequently, as shown in FIG. 2C, the upper clad layer 17c is formed on the upper surface of the core 17b and on the upper surfaces of the glass plate-side positioning marks S1. Thus, the optical waveguide 17 is formed. The upper clad layer 17c is formed by thermal curing of a photosensitive sheet or photosensitive paste containing, for example, an epoxy resin and polyimide resin. Specifically, the upper clad layer 17c is formed by depositing or applying the photosensitive sheet or photosensitive paste containing the resin so as to cover the lower clad layer 17a, the core 17b, and the glass plate-side positioning marks S1, then carrying out exposure and development, followed by thermal curing. The upper clad layer 17c has a thickness of approximately 10-20 µm.

Figure 2D:
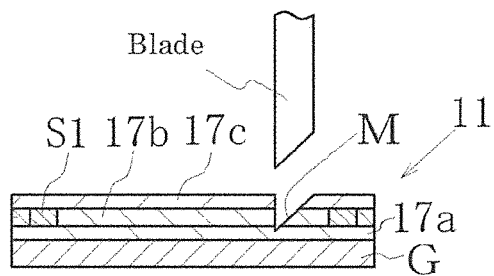

Subsequently, as shown in FIG. 2D, the core 17b is cut by causing the blade to cut into the core 17b from immediately above the optical waveguide 17. Thus, the reflection surface M constituted by the cut surface is formed at the part of the core 17b. The cut surface is perpendicular to the extension direction of the optical waveguide 17, has a certain angle with respect to the upper surface of the glass plate G, and extends from the upper surface of the core 17b to the lower surface of the core 17b. The optical waveguide forming part 11 is formed in this manner.

Figure 3E:
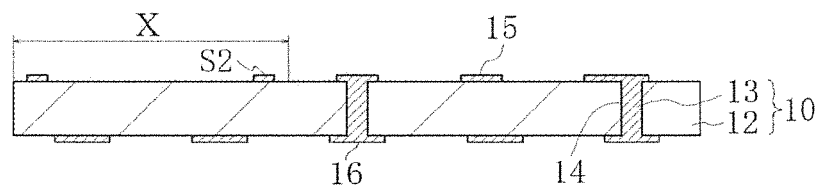
FIGS. 3E and 3F are schematic sectional views that respectively show the steps in the embodiment of the method for manufacturing the optical circuit board according to the present disclosure.

Subsequently, as shown in FIG. 3E, the wiring conductor 13 is formed on the upper and lower surfaces of the insulating layer 12 and inside the through holes 14. The wiring board 10 having the mounting part X on the upper surface of the insulating layer 12 is prepared. The upper surface of the insulating layer 12 is provided with a plurality of electronic component connection pads 15, each being composed of part of the wiring conductor 13. The lower surface of the insulating layer 12 is provided with a plurality of external connection pads 16, each including part of the wiring conductor 13. The mounting part X is provided with a plurality of the board-side positioning marks S2, each including part of the wiring conductor 13. The insulating layer 12 is formed by, for example, impregnating an epoxy resin and a bismaleimide triazine resin into a glass cloth, followed by thermal curing. The through holes 14 are formed by, for example, a drilling process or blasting process. The wiring conductor 13 is formed by, for example, a well-known plating method using metal with satisfactory electrical conductivity, such as copper.

Figure 3F:
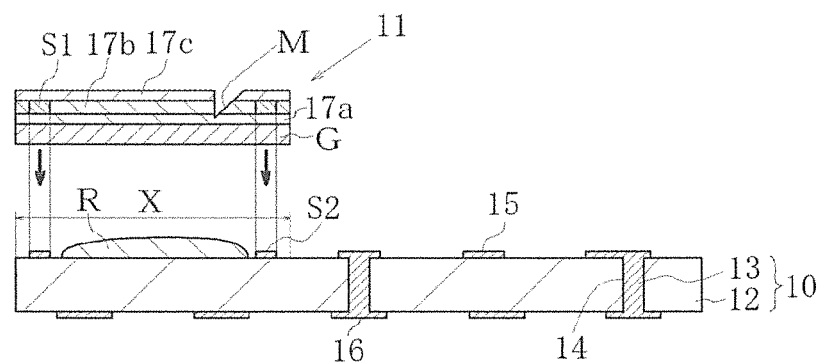

Subsequently, as shown in FIG. 3F, the adhesive R is applied to the mounting part X. Thereafter, positioning is carried out by superimposition between the glass plate-side positioning marks S1 and the board-side positioning marks S2. Subsequently, the optical waveguide forming part 11 is pressedly mounted on the wiring board 10, thereby forming the optical circuit board A as shown in FIG. 1. Thus, the positioning is carried out by superimposing, with a transmission method, the glass plate-side positioning marks S1 on their respective corresponding board-side positioning marks S2. Consequently, the optical waveguide forming part 11 is accurately mounted at a predetermined position in a parallel direction with respect to the mounting part X. It is also easy to carry out positioning in a direction perpendicular to the mounting part X by ensuring the height of the board-side positioning marks S2 so that, during the mounting, a location at which the board-side positioning marks S2 and the lower surface of the glass plate G are contacted with each other corresponds to a predetermined mounting height for the optical waveguide forming part 11.

The optical waveguide forming part 11 is mounted by positioning the glass plate-side positioning marks S1, which are already formed simultaneously with the core 17b, to the board-side positioning marks S2. This enhances registration between the core 17b and the wiring board 10.

With the method for manufacturing the optical circuit board according to the present disclosure as described above, the optical waveguide 17, which has the structure that the core 17b is sandwiched between the lower clad layer 17a and the upper clad layer 17c, is formed on the upper surface of the planar glass plate G so as to extend along the upper surface of the glass plate G. Subsequently, the reflection surface M constituted by the cut surface, which is perpendicular to the extension direction of the optical waveguide 17, has the predetermined angle with respect to the upper surface of the glass plate G, and extends from the upper surface of the core 17b to the lower surface of the core 17b, is formed at the part of the core 17b by cutting the core 17b. This makes it possible to form the reflection surface M at the accurate position by cutting the core 17b. It is consequently possible to provide the method for manufacturing the optical circuit board A capable of accurately performing the transmission and receiving of optical signals between the optical waveguide 17 and the electronic component D by achieving alignment between the central axis in the extension direction of the core 17b and the central position of the reflection surface M.

The mounting of the electronic component D is carried out by employing a method for connecting an electrode T of the electronic component D and the electronic component connection pads 15 with solder interposed therebetween in a state in which an optical signal transmission/receiving part P of the electronic component D is opposed to the reflection surface M.

The method for manufacturing the optical circuit board according to the present disclosure is not limited to the above embodiment, and various changes can be made therein without departing from the scope of the present disclosure. For example, the manufacturing method according to the above embodiment includes forming the reflection surface M by cutting the core 17b by causing the blade to cut into the core 17b from immediately above the optical waveguide 17. Alternatively, the reflection surface M may be formed by cutting the core 17b, for example, by causing the blade to cut into or by laser irradiation to the core 17b at a predetermined angle obliquely from above the optical waveguide 17.

In the manufacturing method according to the above embodiment, no solder resist layer is deposited on the wiring board 10. Alternatively, a solder resist layer having openings configured to expose a middle part of each of the electronic component connection pads 15 and the external connection pads 16 may be formed on the upper and lower surfaces of the insulating layer 12.

Figure 4:
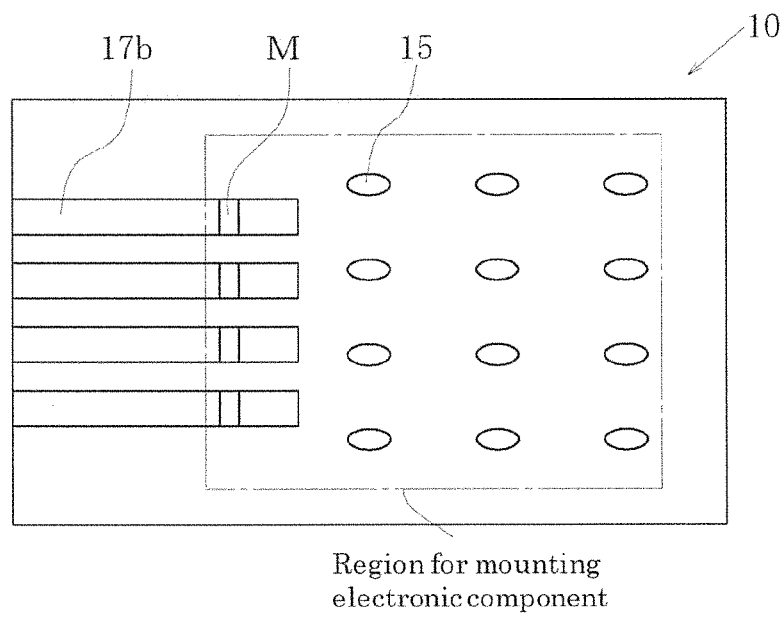
FIG. 4 is a schematic top view that shows an example of a wiring board used for the optical circuit board to be formed by the embodiment of the method for manufacturing an optical circuit board according to the present disclosure.
Figure 5:
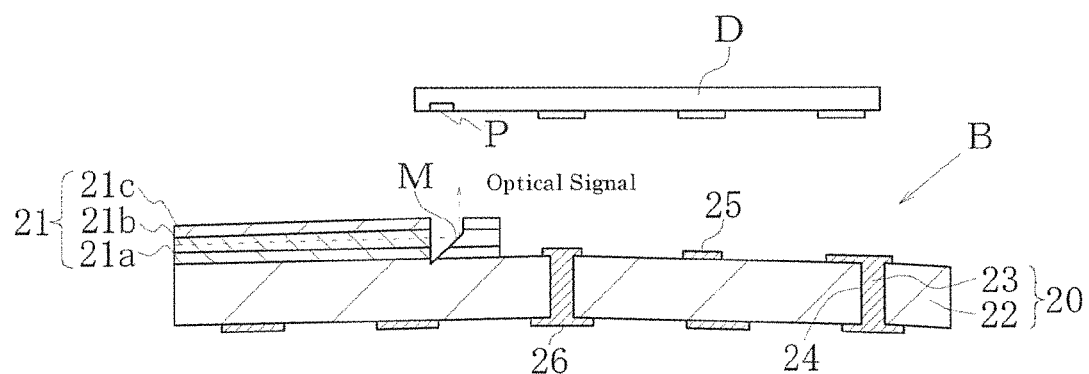
FIG. 5 is schematic sectional view that shows an optical circuit board to be formed by a conventional manufacturing method.
Figure 6A:
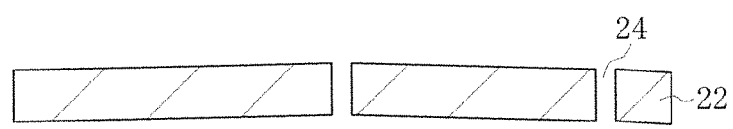
FIGS. 6A to 6D are schematic sectional views that respectively show the steps of the conventional method for manufacturing an optical circuit board.
Figure 6B:
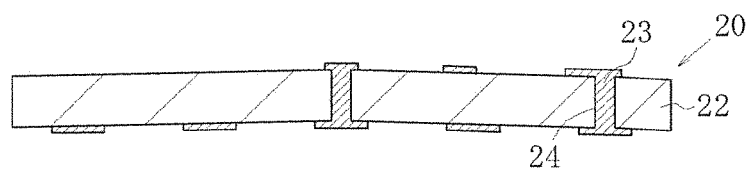
Figure 6C:
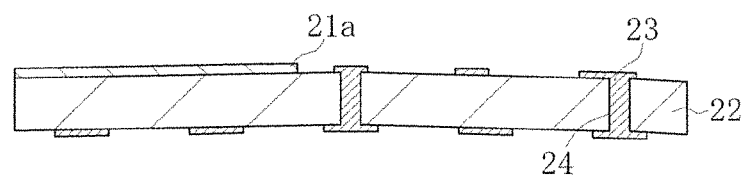
Figure 6D:
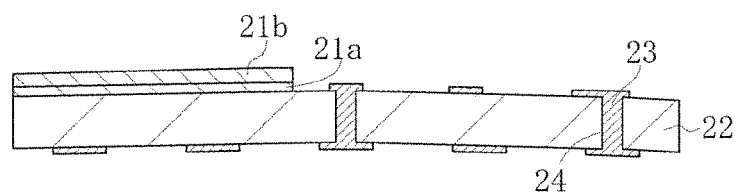
Figure 7E:
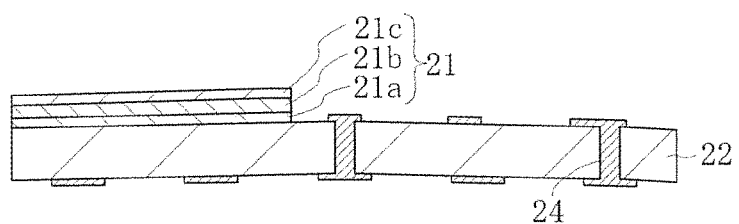
FIGS. 7E and 7F are schematic sectional views that respectively show the steps of the conventional method for manufacturing the optical circuit board.
Figure 7F:
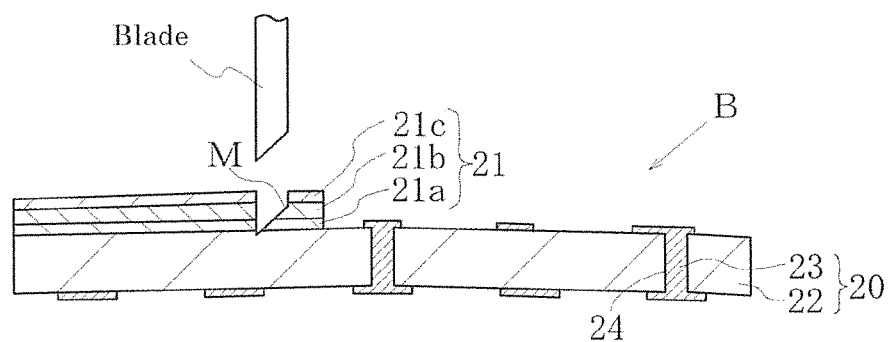

As shown in FIG. 4, a diameter of each of the electronic component connection pads 15 on the upper surface of the wiring board 10 in the extension direction of the core 17b may be larger than a diameter thereof in a direction perpendicular to the extension direction. With this configuration, even when misregistration occurs at the central position of the reflection surface M in the extension direction due to accuracy dispersion during the formation of the reflection surface M, or the like, the electrode of the electronic component D to be mounted in each of the electronic component connection pads 15 having the large diameter in the extension direction is shiftable according to the misregistration in order to establish a connection. It is consequently possible to finely adjust alignment between the central position of the reflection surface M and the optical signal transmission/receiving part P in the electronic component D. This makes it possible to more accurately perform the optical signal transmission and receiving between the optical waveguide 17 and the electronic component D. When depositing the solder resist layer, there is a need to form an opening satisfying the condition that the length of a diameter in the extension direction is larger than the length of a diameter in the direction perpendicular to the extension direction.

What is claimed is:

1. A method for manufacturing an optical circuit board, comprising:
    forming an optical waveguide having a structure that a core is sandwiched between a lower clad layer and an upper clad layer so as to extend along an upper surface of a glass plate, and forming a glass plate-side positioning mark composed of a same material as the core, between the lower clad layer and the upper clad layer in a region other than the core;
    forming a reflection surface at a part of the core by cutting the core, the reflection surface being constituted by a cut surface that is perpendicular to an extension direction of the optical waveguide, has a certain angle with respect to the upper surface, and extends from an upper surface of the core to a lower surface of the core;
    preparing a wiring board having, on an upper surface thereof, a board-side positioning mark corresponding to the glass plate-side positioning mark and formed so as to protrude from the upper surface thereof; and
    mounting the glass plate, having the optical waveguide formed thereon, on the upper surface of the wiring board so that the glass plate-side positioning mark and the board-side positioning mark are superimposed on each other and so that an upper surface of the board-side positioning mark and a lower surface of the glass plate are contacted with each other.

2. The method for manufacturing an optical circuit board according to claim 1, further comprising forming, on the upper surface of the wiring board, an electronic component connection pad configured to mount thereon an electronic component configured to perform optical signal transmission and receiving with respect to the core through the reflection surface.

3. The method for manufacturing an optical circuit board according to claim 2, wherein a diameter of the electronic component connection pad in the extension direction is made larger than a diameter of the electronic component connection pad in a direction perpendicular to the extension direction when seen from a top view.

4. An optical circuit board, comprising:
    a wiring board comprising an insulating layer, a wiring conductor, and a board-side positioning mark; and
    an optical waveguide forming part comprising an optical waveguide,
    wherein the board-side positioning mark is formed so as to protrude from the upper surface of the wiring board,
    wherein the optical waveguide forming part comprises a glass plate and the optical waveguide extending along an upper surface of the glass plate,
    wherein the optical waveguide has a structure that a core provided with a glass plate-side positioning mark composed of a same material as the core is sandwiched between a lower clad layer and an upper clad layer;
    wherein the core comprises a reflection surface constituted by a cut surface extending from an upper surface of the core to a lower surface of the core so as to be perpendicular to an extension direction of the optical waveguide and have a certain angle with respect to the upper surface of the glass plate, and
    wherein the optical waveguide forming part is mounted on an upper surface of the wiring board so that the board-side positioning mark and the glass plate-side positioning mark are superimposed on each other, and so that an upper surface of the board-side positioning mark and a lower surface of the glass plate are contacted with each other.

5. The optical circuit board according to claim 4, further comprising, on the upper surface of the wiring board, an electronic component connection pad configured to mount thereon an electronic component configured to perform optical signal transmission and receiving with respect to the core through the reflection surface.

6. The optical circuit board according to claim 5, wherein a diameter of the electronic component connection pad in the extension direction is larger than a diameter of the electronic component connection pad in a direction perpendicular to the extension direction when seen from a top view.

* * * * *